(12) United States Patent
Stahl

(10) Patent No.: US 6,407,349 B1
(45) Date of Patent: Jun. 18, 2002

(54) COMPACT WEIGHING CELL FOR AN ELECTRONIC BALANCE

(75) Inventor: Albrecht Stahl, Sulzbach/Murr (DE)

(73) Assignee: Soehnle-Waagen GmbH & Co., Murrhardt (DE)

( * ) Notice: Subject to any disclaimer, the term of this patent is extended or adjusted under 35 U.S.C. 154(b) by 1279 days.

(21) Appl. No.: 08/820,238

(22) Filed: Mar. 18, 1997

Related U.S. Application Data

(63) Continuation of application No. 08/199,250, filed as application No. PCT/EP92/01693 on Jul. 24, 1992, now abandoned.

(30) Foreign Application Priority Data

Aug. 28, 1991 (DE) .......................................... 41 28 557

(51) Int. Cl.[7] .................................................. G01G 7/06
(52) U.S. Cl. ............................ 177/210 C; 73/862.626
(58) Field of Search ........................ 177/210 C, 210 R, 177/229; 73/862.639, 724, 862.626; 361/280, 281, 283.1

(56) References Cited

U.S. PATENT DOCUMENTS

| | | | |
|---|---|---|---|
| 4,295,376 A | | 10/1981 | Bell ............................ 73/724 |
| 4,308,929 A | | 1/1982 | Estavoyer ................... 177/210 |
| 4,520,339 A | * | 5/1985 | Utsunomiya ............ 177/211 X |
| 4,718,287 A | * | 1/1988 | Mishliborsky ......... 73/862.639 |
| 4,747,456 A | * | 5/1988 | Kitagawa et al. ........... 177/211 |
| 4,846,294 A | | 7/1989 | Sato ........................... 177/210 |
| 4,856,603 A | * | 8/1989 | Murakoso et al. ...... 177/210 C |
| 5,453,628 A | * | 9/1995 | Hartsell et al. ........... 73/724 X |

FOREIGN PATENT DOCUMENTS

| | | |
|---|---|---|
| GB | 1 371 835 | 10/1974 |
| GB | 2 047 410 | 11/1980 |

* cited by examiner

Primary Examiner—Randy W. Gibson
(74) Attorney, Agent, or Firm—Jones, Tullar & Cooper, P.C.

(57) ABSTRACT

Described is a weighing cell for an electronic balance with two side walls (15, 16) which move parallel to each other as a function of the weight and in which are located two metal plates forming a condensor whose capacitance varies with the weight. One plate is a circuit board (17) which has a metal film (20) on the side facing the other plate (23) and which also carries the components (18, 19, 19') of the electric circuitry of the balance.

3 Claims, 1 Drawing Sheet

COMPACT WEIGHING CELL FOR AN ELECTRONIC BALANCE

This is a continuation of application Ser. No. 08/199,250 filed on Feb. 28, 1994, abandoned, which is the U.S. national stage of PCT/EP92/01693, filed Jul. 24, 1992.

BACKGROUND OF THE INVENTION

The present invention relates to a weighing cell for an electronic balance with two sidewalls which are displaced parallel to each other as a function of a weight, in which two metallic plates are disposed, forming a capacitor with capacitances changing as a function of weight.

Such weighing cells are known from DE 29 14 449 C2.

A capacitive transducer is known from DE 29 48 165 A1. It consists of a rigid diaphragm body and a displaceable plate disposed above it. A movable diaphragm part, which is displaced by pressure in a pressure chamber, is provided inside the rigid diaphragm body. It supports the plate by means of spacing beads, so that the flexible part is displaced when the pressure chamber is charged with pressure. Flat areas of a conducting material are placed by vacuum evaporation on the flexible diaphragm part. Flat areas are also placed on the plate by vacuum evaporation. They respectively form an outer and an inner electrode pair, which change their capacitance differently when the diaphragm part is displaced. An output signal is derived from this change when the pressure chamber is charged with pressure. The non-displaceable part of the diaphragm has electrical switching elements on an extension. The complicated construction is disadvantageous in this arrangement, as well as the fact that it is necessary to dispose a flexible diaphragm part, on which it is intended to place different flat areas by means of vacuum evaporation, inside a rigid and non-displaceably disposed diaphragm body. In addition, the transfer of this arrangement to other arrangements is very difficult, because in DE 29 48 165 the pressure chamber must be carefully sealed. The object of the invention, also in respect to this arrangement, is to provide a considerably simplified and, in regard to its volume, more compact unit of weighing cell and evaluation electronics.

SUMMARY OF THE INVENTION

It is an object of the present invention to provide a weighing cell of this type which is even more compact and simple, particularly with the view that the entire balance, i.e. inclusive of the associated electronic components, can be constructed smaller and simpler.

This object is attained in accordance with the present invention in that it is provided, in a weighing cell with two sidewalls which are displaced parallel to each other as a function of a weight, in which two metallic tabs are disposed, forming a capacitor with capacitances changing as a function of weight, that one plate is a printed circuit board which is provided with a metallic layer on the side facing the other plate and which furthermore supports the components of the electrical switching device of the balance.

Thus, in accordance with the present invention it is possible to use one plate of the capacitor already as a printed circuit board which contains the components of the evaluation and display circuit. In this way a great amount of space is saved. In contrast to the known device, this plate is not rigidly disposed, but is a part of the movable capacitor arrangement. It is not necessary to provide the plate with a flexible diaphragm part, as in the prior art, instead it is itself rigid, but movable.

BRIEF DESCRIPTION OF THE DRAWINGS

An exemplary embodiment of the present invention and its advantageous further embodiment are described in what follows. Shown are in.

DESCRIPTION OF THE PREFERRED EMBODIMENT

Figure 1:
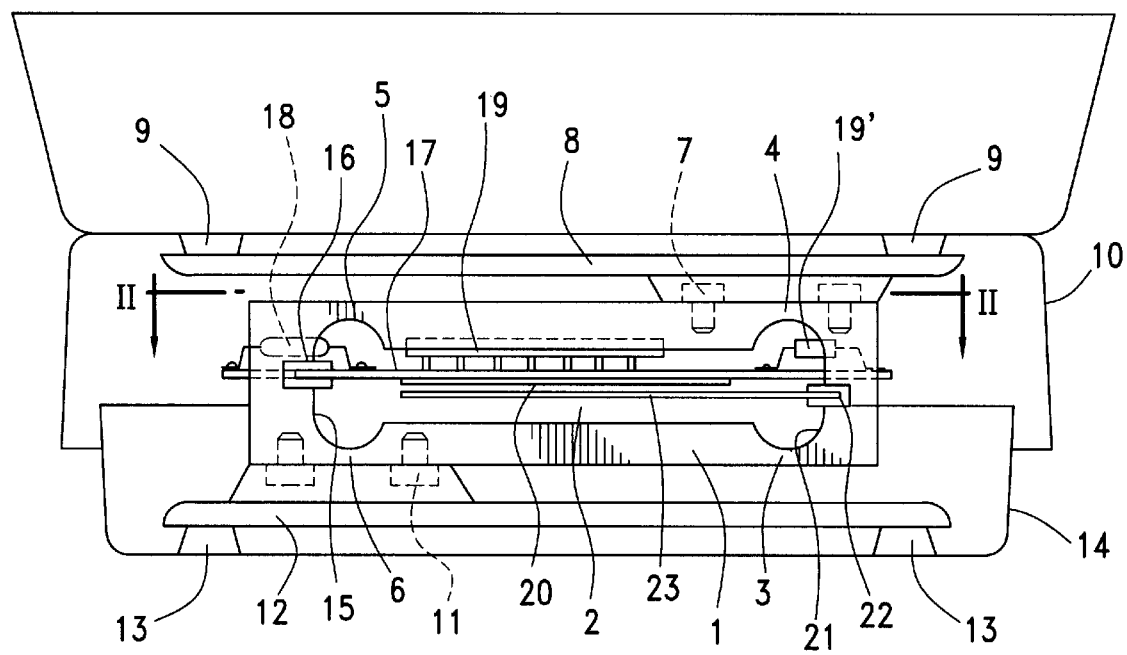
FIG. 1, a front elevational view of an electronic balance according to an exemplary embodiment of the present invention.

The weighing cell 1 consists of a metallic block, which in top view (FIG. 2) is rectangular and in cross section is provided with a recess 2. The recess 2 (see FIG. 1) has the shape of a slit which widens at both sides, so that four areas 3, 4, 5 and 6 with reduced material cross sections are generated which, when the weighing cell 1 is put under a load, act like the hinges of a parallel guide bar. A plate 8 is screwed to the top of the weighing cell 1 with screws 7 and supports by means of supports 9 the top 10 of the balance, which has a tray into which the material to be weighed is placed during weighing. The underside of the weighing cell 1 is connected by means of screws 11 with a plate 12. The latter is seated on the lower part 14 of the balance by means of supports 13.

A printed circuit board 17, the upper side of which is equipped with the components of the electrical circuitry of the balance, for example resistors 18 and ICs 19, 19', is seated in the left wall 15 of the recess 2 of the weighing cell 1 and is held in an insulating block 16. In the area where it is inside the recess 2, the underside of the printed circuit board 17 is provided with a metallic layer.

A further metal plate 23 is maintained by means of an insulating block 22 in the right wall 21 of the recess 2. It forms, together with the metallic layer 20 on the printed circuit board 17, a capacitor which is a part of an oscillator circuit of the balance. The oscillator circuit is embodied, among other things, by means of the components on the printed circuit board 17.

When a load is placed on the balance, the weighing cell acts—as already mentioned—like a parallel guide bar, with the result that the right part (with FIG. 1) of the weighing cell is lower in respect to the left part thereof, so that in this way the distance between the metal layer 20 on the underside of the printed circuit board 17 on the one hand, and the metal plate 23 on the other is increased and that in this way the capacitance of the capacitor formed by both is changed as a function of weight.

Figure 2:
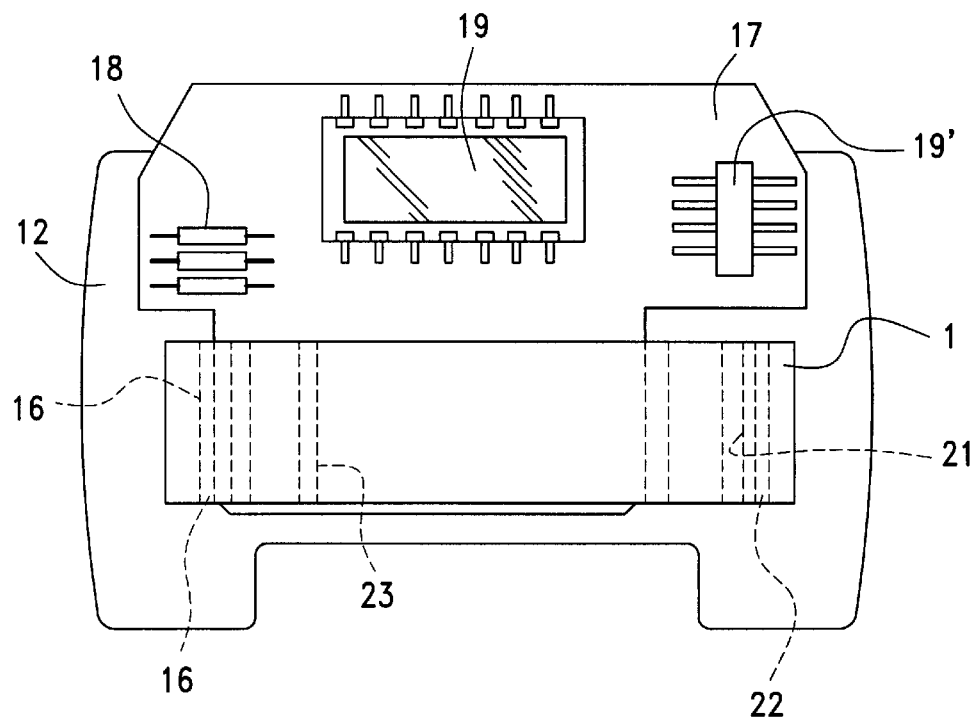
FIG. 2, a top view in the direction of the arrows II—II in FIG. 1.

The described balance is distinguished over known designs in that one of the two plates forming the capacitor which changes as a function of the weight is constituted by the printed circuit board 17 which, on its side facing the other metal plate—namely the metal plate 23—is provided with a metallic layer 20 to form the capacitor. However, the printed circuit board 17 is embodied considerably larger than the area in which it contributes to the formation of the capacitor within the recess 2 of the weighing cell 1. As can be seen in FIG. 2, the area of the printed circuit board 17 extending outside of the recess 2 is used to receive the electrical components of the evaluation and display circuit.

What is claimed is:

1. A weighing cell for an electronic balance having electrical circuit components, the weighing cell defining two sidewalls which are displaced parallel to each other as a function of a weight placed on the electronic balance, and including two metallic plates which move relative to each other and together form a capacitor with capacitances that change as a function of said relative movement caused by the weight placed on the electronic balance, wherein one of said plates defines a printed circuit board, having two sides with one side facing said other of said plates, and being provided with a metallic layer, and the other side supporting electrical circuit components of the electronic balance.

2. The weighing cell as defined in claim 1, wherein said metallic plates are supported between said sidewalls.

3. The weighing cell as defined in claim 2, wherein said sidewalls define a recess in which said plates extend.

* * * * *